United States Patent
Zou

(10) Patent No.: US 10,554,737 B2
(45) Date of Patent: Feb. 4, 2020

(54) METHOD AND APPARATUS FOR LEVELING LOADS OF DISTRIBUTED DATABASES

(71) Applicant: TENCENT TECHNOLOGY (SHENZHEN) COMPANY LIMITED, Shenzhen (CN)

(72) Inventor: Runmou Zou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 58 days.

(21) Appl. No.: 15/833,147

(22) Filed: Dec. 6, 2017

(65) Prior Publication Data
US 2018/0097875 A1    Apr. 5, 2018

Related U.S. Application Data

(63) Continuation of application No. PCT/CN2016/092005, filed on Jul. 28, 2016.

(30) Foreign Application Priority Data

Jul. 29, 2015 (CN) .......................... 2015 1 0456585

(51) Int. Cl.
*H04L 29/08* (2006.01)
*G06F 3/06* (2006.01)

(52) U.S. Cl.
CPC ........ *H04L 67/1008* (2013.01); *G06F 3/0611* (2013.01); *G06F 3/0647* (2013.01); *G06F 3/0689* (2013.01); *H04L 67/1097* (2013.01)

(58) Field of Classification Search
None
See application file for complete search history.

(56) References Cited

U.S. PATENT DOCUMENTS 6,965,651 B1 * 11/2005 Chou ................... H04L 25/14
                                                              375/260
7,281,105 B1 * 10/2007 Wang ................... G06F 3/061
                                                              711/112
(Continued)

FOREIGN PATENT DOCUMENTS

CN    103095804 A    5/2013
CN    103327094 A    9/2013
(Continued)

OTHER PUBLICATIONS

International Preliminary Report on Patentability in International Application No. PCT/CN2016/092005 dated Jan. 30, 2018, 6 pages.
(Continued)

*Primary Examiner* — Philip J Chea
*Assistant Examiner* — Hassan A Khan
(74) *Attorney, Agent, or Firm* — Marshall, Gerstein & Borun LLP

(57) ABSTRACT

The present disclosure provides a method for leveling loads of distributed databases, including: counting loads of all servers in a distributed database system and a load proportion of each data slice loaded on each server during a statistical period; ranking respective servers according to loads of the respective servers from the highest to the lowest, allocating n top-ranked servers as high-load servers, allocating n bottom-ranked servers as low-load servers; ranking data slices loaded on an i-th ranked high-load server; ranking data slices loaded on an i-th inversely ranked low-load server; allocating a data slice on a high-load server as a source data slice, allocating a data slice on a low-load server as a target data slice, and swapping the source data slice and the target data slice. The present disclosure further discloses an apparatus for leveling loads of distributed databases.

18 Claims, 8 Drawing Sheets

(56) References Cited

U.S. PATENT DOCUMENTS

| | | | | |
|---|---|---|---|---|
| 7,281,106 | B1* | 10/2007 | Arnan | G06F 3/061 |
| | | | | 711/112 |
| 8,930,746 | B1* | 1/2015 | Chen | G06F 11/0793 |
| | | | | 714/6.13 |
| 8,949,483 | B1* | 2/2015 | Martin | G06F 3/0653 |
| | | | | 710/15 |
| 2009/0013015 | A1* | 1/2009 | McBride | G06F 3/061 |
| 2011/0197046 | A1* | 8/2011 | Chiu | G06F 3/0617 |
| | | | | 711/171 |
| 2011/0289366 | A1* | 11/2011 | Baptist | H04L 9/085 |
| | | | | 714/54 |
| 2013/0151683 | A1* | 6/2013 | Jain | G06F 3/0611 |
| | | | | 709/223 |
| 2013/0306276 | A1* | 11/2013 | Duchesneau | G06F 9/5072 |
| | | | | 165/104.21 |
| 2013/0326167 | A1* | 12/2013 | Dhuse | G06F 11/1088 |
| | | | | 711/158 |
| 2014/0351294 | A1* | 11/2014 | Kumano | G06F 16/2228 |
| | | | | 707/812 |
| 2015/0355960 | A1* | 12/2015 | Volvovski | G06F 11/0775 |
| | | | | 714/54 |

FOREIGN PATENT DOCUMENTS

| | | |
|---|---|---|
| JP | S62235646 A | 10/1987 |
| JP | 2005-209055 A | 8/2005 |
| JP | 2014-186364 A | 10/2014 |
| JP | 2014-229235 A | 12/2014 |

OTHER PUBLICATIONS

Search Report in International Application No. PCT/CN2016/092005 dated Oct. 19, 2016, 4 pages.

European Search Report for Application No. EP 16829864.4 dated Jun. 1, 2018.

Office Action in JP Application No. 2018-522846 dated Feb. 4, 2019, 7 pages.

* cited by examiner

METHOD AND APPARATUS FOR LEVELING LOADS OF DISTRIBUTED DATABASES

CROSS-REFERENCE TO RELATED APPLICATIONS

This application is a continuation of International Application No. PCT/CN2016/092005, filed on Jul. 28, 2016, which claims the benefit of priority to Chinese Patent Application No. 201510456585.2, filed with the Chinese Patent Office on Jul. 29, 2015, the disclosures of which are incorporated herein by reference in their entireties.

FIELD OF THE TECHNOLOGY

The present disclosure relates to internet technologies, and in particular to a method and apparatus for leveling loads of distributed databases.

BACKGROUND OF THE DISCLOSURE

In recent years, with the rapid growth in the amount of data, the distributed database technology has also been rapidly developed. The distributed database technology divides data in an original centralized database into a large number of data slices, dispersedly stores them on a plurality of independent data storage nodes, and connects the physically dispersed plurality of data storage units to form a logically unified database. The distributed database technology uses a scalable system architecture where multiple servers are used to share the storage load, which not only improves the system reliability, availability and access efficiency, but also is easy to expand. In order to maintain the balanced distribution of data slices, when the number of data slices on a server among the overall distributed database system reaches a migration threshold, it is necessary to move data slices on a server which stores the maximum number of data slices to a server which stores less number of data slices. For example, if a data set has 100 data slices on a server A and 50 data slices on a server B, it is necessary to move data slices on the server A to the server B until the numbers of data slices of the data set on the two servers are close or equal.

SUMMARY

Embodiments of the present disclosure provide a method and apparatus for leveling loads of distributed databases to effectively reduce the load of the overall distributed database system.

Embodiments of the present disclosure provide a method for leveling loads of distributed databases, implemented on an apparatus for leveling loads of distributed databases including a memory storing instructions and a processor in communication with the memory, the method including:

counting loads of all servers in a distributed database system and a load proportion of each data slice loaded on each server during a statistical period;

ranking respective servers according to loads of the respective servers; dividing the servers into a top-ranked server group and a bottom-ranked server group, in which the top-ranked server group includes n top-ranked servers allocated as high-load servers, the bottom-ranked server group includes n bottom-ranked servers allocated as low-load servers, and n is a positive integer;

traversing the high-load servers and the low-load servers to perform the following operations, including:

ranking, according to load proportions of respective data slices, data slices loaded on an i-th ranked high-load server from the highest to the lowest;

ranking, according to load proportions of respective data slices, data slices loaded on an i-th inversely ranked low-load server from the highest to the lowest, in which i is a positive integer, and i is less than or equal to n;

allocating a data slice on the i-th ranked high-load server as an i-th source data slice;

allocating a data slice on the i-th inversely ranked low-load server as an i-th target data slice; and swapping the i-th source data slice and the i-th target data slice.

Embodiments of the present disclosure provide an apparatus for leveling loads of distributed databases, including a processor and a memory, in which the memory stores instructions executable by the processor, and the instructions are executed to perform:

counting loads of all servers in a distributed database system and a load proportion of each data slice loaded on each server during a statistical period;

ranking respective servers according to loads of the respective servers; dividing the servers into a top-ranked server group and a bottom-ranked server group, in which the top-ranked server group includes n top-ranked servers allocated as high-load servers, the bottom-ranked server group includes n bottom-ranked servers allocated as low-load servers, and n is a positive integer;

traversing the high-load servers and the low-load servers to perform the following operations, including:

ranking, according to load proportions of respective data slices, data slices loaded on an i-th ranked high-load server from the highest to the lowest;

ranking, according to load proportions of respective data slices, data slices loaded on an i-th inversely ranked low-load server from the highest to the lowest, in which i is a positive integer, and i is less than or equal to n;

allocating a data slice on the i-th ranked high-load server as an i-th source data slice;

allocating a data slice on the i-th inversely ranked low-load server as an i-th target data slice; and swapping the i-th source data slice and the i-th target data slice.

Embodiments of the present disclosure provide a non-transitory storage medium, storing computer instructions, in which the computer instructions are executable by the processor to perform:

counting loads of all servers in a distributed database system and a load proportion of each data slice loaded on each server during a statistical period;

ranking respective servers according to loads of the respective servers; dividing the servers into a top-ranked server group and a bottom-ranked server group, in which the top-ranked server group includes n top-ranked servers allocated as high-load servers, the bottom-ranked server group includes n bottom-ranked servers allocated as low-load servers, and n is a positive integer;

traversing the high-load servers and the low-load servers to perform the following operations, including:

ranking, according to load proportions of respective data slices, data slices loaded on an i-th ranked high-load server from the highest to the lowest;

ranking, according to load proportions of respective data slices, data slices loaded on an i-th inversely ranked low-load server from the highest to the lowest, in which i is a positive integer, and i is less than or equal to n;

allocating a data slice on the i-th ranked high-load server as an i-th source data slice;

allocating a data slice on the i-th inversely ranked low-load server as an i-th target data slice; and swapping the i-th source data slice and the i-th target data slice.

The fulfillment of the objects, the characteristics, and advantages of the present disclosure will be described in detail with reference to the embodiments and the attached figures.

DESCRIPTION OF EMBODIMENTS

It is to be understood that the detailed embodiments described herein are merely illustrative of the present disclosure and are not intended to be limiting of the present disclosure.

The traditional method for balancing the distribution of data slices only takes into account capacities of the data slices, but does not take into account loads occupied by the data slices. However, if a load occupied by a data slice to be moved is too high, when the data slice is moved to another server, it may cause the load of the other server to be too high, which may affect an overall efficiency of the distributed database system.

Figure 1:
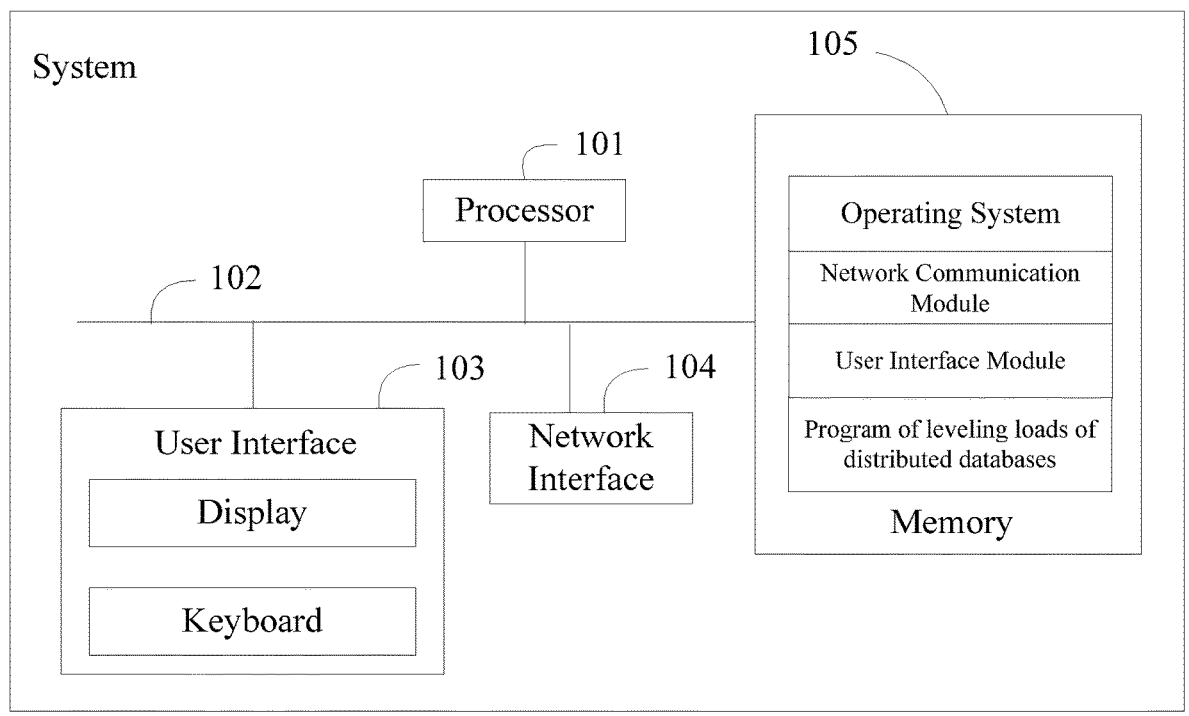
FIG. 1 is a diagram of an overall system where an apparatus for leveling loads of distributed databases is located according to embodiments of the present disclosure.

Referring to FIG. 1, FIG. 1 is a diagram of an overall system where an apparatus for leveling loads of distributed databases is located according to embodiments of the present disclosure. The system may include a processor 101 such as a CPU, a network interface 104, a user interface 103, a memory 105, and a communication bus 102. The communication bus 102 is configured to carry out connections and communications between these components. The user interface 103 may include a display, a keyboard, a standard wired interface, and a standard wireless interface. The network interface 104 may include a standard wired interface and a standard wireless interface (e.g., a Wi-Fi interface). The memory 105 may be a high speed Random-access Memory (RAM), or may be a non-volatile memory or a non-transitory memory, such as magnetic disk storage. The memory 105 may also be a storage device located remotely from the processor 101 described above. As a computer storage medium, the memory 105 may include an operating system, a network communication module, a user interface module, and a program for leveling loads of distributed databases.

In the system where the apparatus for leveling loads of distributed databases is located as shown in FIG. 1, the network interface 104 is mainly configured to connect to a server or a terminal to perform data communications with the server or the terminal; and the user interface 103 is mainly configured to receive user instructions and interact with the user; and the processor 101 may call the program for leveling loads of distributed databases stored in the memory 105 to perform the following operations:

counting loads of all servers in a distributed database system and a load proportion of each data slice loaded on each server during a statistical period;

ranking respective servers according to loads of the respective servers; dividing the servers into a top-ranked server group and a bottom-ranked server group, in which the top-ranked server group includes n top-ranked servers allocated as high-load servers, the bottom-ranked server group includes n bottom-ranked servers allocated as low-load servers, and n is a positive integer;

traversing the high-load servers and the low-load servers to perform the following operations, including:

ranking, according to load proportions of respective data slices, data slices loaded on an i-th ranked high-load server from the highest to the lowest;

ranking, according to load proportions of respective data slices, data slices loaded on an i-th inversely ranked low-load server from the highest to the lowest, in which i is a positive integer, and i is less than or equal to n;

allocating a data slice on the i-th ranked high-load server as an i-th source data slice;

allocating a data slice on the i-th inversely ranked low-load server as an i-th target data slice; and swapping the i-th source data slice and the i-th target data slice.

In an embodiment, the processor 101 invokes the program for leveling loads of distributed databases stored in the memory 105 to perform the following operations:

allocating a data slice that has a lowest load proportion on the i-th inversely ranked low-load server as the i-th target data slice;

allocating a data slice that has a j-th ranked load proportion on the i-th ranked high-load server as the i-th source data slice, where j is a positive integer, an initial value of j is 1, and j is less than or equal to the number of data slices on the i-th ranked high-load server;

predetermining whether an overall load proportion of the i-th inversely ranked low-load server among the respective servers is more than a predetermined server load proportion threshold after the i-th target data slice and the i-th source data slice are swapped; and if so, then updating the i-th source data slice using a data slice next to the data slice that has the j-th ranked load proportion on the i-th ranked high-load server, and predetermining whether the overall load proportion of the i-th inversely ranked low-load server among the respective servers is more than the predetermined server load proportion threshold after the i-th target data slice and the updated i-th source data slice are swapped, until the overall load proportion of the i-th inversely ranked low-load server is less than or equal to the predetermined server load proportion threshold.

In an embodiment, the processor 101 invokes the program for leveling loads of distributed databases stored in the memory 105 further to perform the following operations:

determining whether a load proportion of a data slice that has the highest load proportion on the i-th ranked high-load server is more than a predetermined data slice load proportion threshold; and if so, then refusing to perform a swapping operation using data slices on the i-th ranked high-load server; or if no, then performing the step of allocating a data slice that has a lowest load proportion on the i-th inversely ranked low-load server as the i-th target data slice.

In an embodiment, the processor 101 invokes the program for leveling loads of distributed databases stored in the memory 105 further to perform the following operations:

entering into a next statistical period as a current statistical period, and counting loads of all the servers during the current statistical period;

ranking the respective servers according to loads of the respective servers; dividing the servers into a top-ranked server group and a bottom-ranked server group, in which the top-ranked server group includes n top-ranked servers allocated as high-load servers in the current statistical period;

determining whether the n high-load servers in the current statistical period are the same with the n high-load servers in the previous statistical period;

if so, then increasing the predetermined data slice load proportion threshold, and re-leveling all the high-load servers in the current statistical period, i.e., traversing high-load servers and low-load servers again, and performing corresponding operations.

In an embodiment, the processor 101 invokes the program for leveling loads of distributed databases stored in the memory 105 further to perform the following operations:

ranking the respective servers according to CPU loads of the respective servers from the highest to the lowest, allocating n1 top-ranked servers as a first group of high-load servers, and allocating n1 bottom-ranked servers as a first group of low-load servers, in which n1 is a positive integer less than n;

excluding the first group of high-load servers and the first group of low-load servers from the respective servers, ranking remaining servers according to traffic loads of the ranking remaining servers from the highest to the lowest, allocating n2 top-ranked servers as a second group of high-load servers, and allocating n2 bottom-ranked servers as a second group of low-load servers, in which n2 is a positive integer less than n, and n1+n2=n.

In an embodiment, the processor 101 invokes the program for leveling loads of distributed databases stored in the memory 105 to perform the following operations:

obtaining information of an idle server from the distributed data system;

transferring the i-th source data slice from the i-th ranked high-load server to the idle server;

transferring the i-th target data slice from the i-th inversely ranked low-load server to the i-th ranked high-load server; and transferring the i-th source data slice transferred to the idle server to the i-th inversely ranked low-load server.

The apparatus for leveling loads of distributed databases and the distributed database system where the apparatus is located as described in FIG. 1, rank servers according to loads of the servers, filter out high-load servers and low-load servers respectively, and swap a data slice that has a high load proportion on a high-load server and a data slice that has a low load proportion on a low-load server, thereby on one hand, effectively reducing the load of the high-load server, and on the other hand, reducing a part of load pressure of the low-load server and sparing a part of load space for a data slice newly swapped in because a part of data slices on the low-load server are swapped out, and thus avoiding a situation where when a data slice on a high-load server is swapped in a low-load server, it may cause the low-load server has a too large load, and effectively reducing the load of the overall distributed database system.

Figure 2:
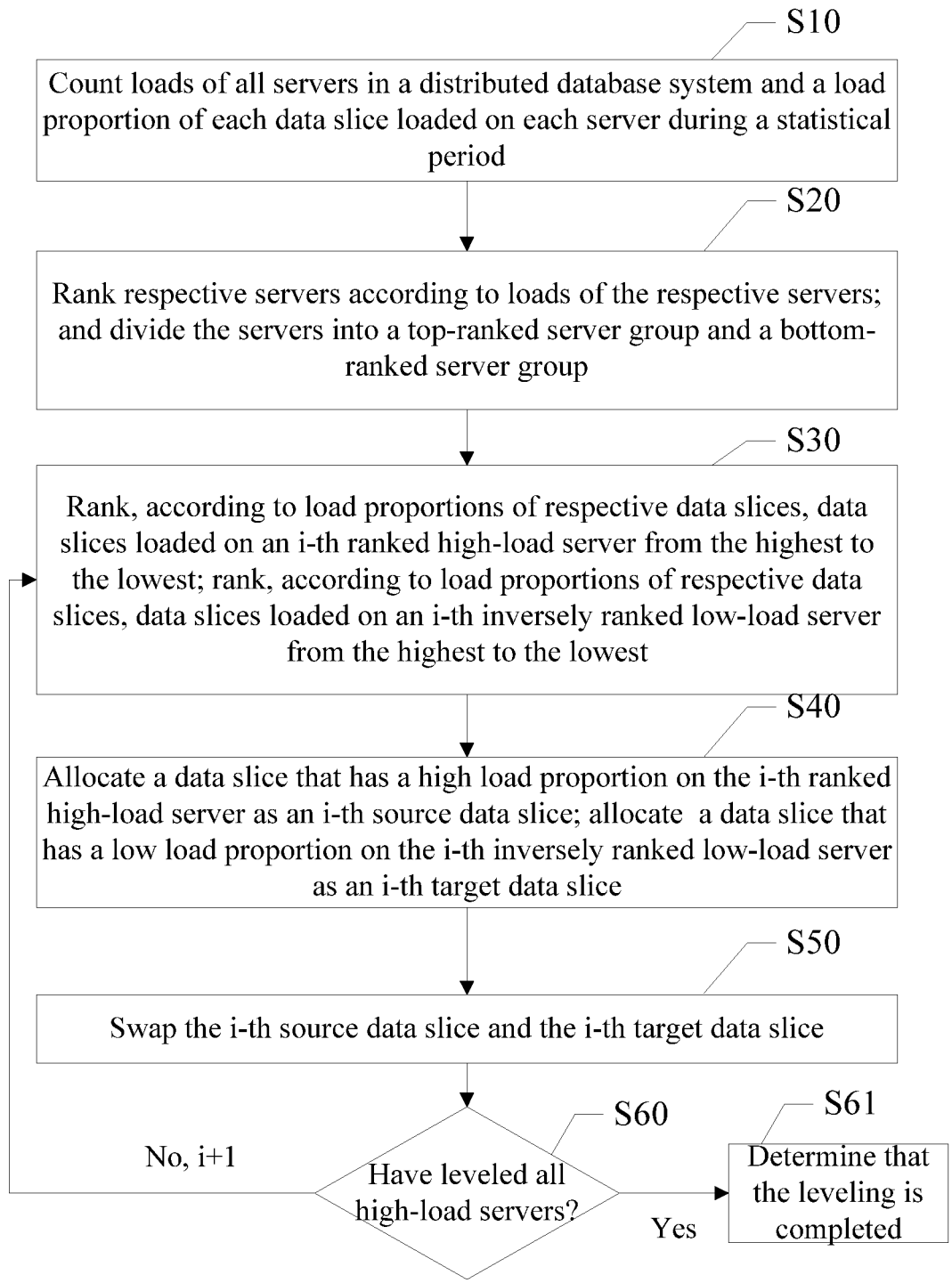
FIG. 2 is a flow chart of an embodiment of a method for leveling loads of distributed databases according to the present disclosure.

As shown in FIG. 2, FIG. 2 is a flowchart of an embodiment of a method for leveling loads of distributed databases according to the present disclosure. The method for leveling loads of distributed databases mentioned in the present embodiment includes the following steps:

In step S10, loads of all servers in a distributed database system and a load proportion of each data slice loaded on each server are counted during a statistical period.

The distributed database system of the present embodiment includes a plurality of shard servers, and each server is loaded with a plurality of data slices. On each server, a monitoring and reporting program is deployed in advance to report information such as a number of data requests and an amount of traffic occupied when a data slice is accessed to a statistic database of the distributed database system at regular intervals. Meanwhile, the system may also obtain loads of respective servers, e.g., CPU loads and traffic loads, during a current statistical period from a webmaster server. According to information such as a number of data requests and an amount of traffic of access of a certain data slice and a load of a server where the data slice is located reported in the current statistical period, the system obtains a load proportion of the data slice in the load of the server, i.e., a proportion of a load caused when the server processes the access request(s) of the data slice in a total load of the server. The statistical period may be 24 hours a day, or more. Take 24 hours as an example, the monitoring and reporting program may report data every 5 minutes, and then there are 288 pieces of report information for a data slice in 24 hours. To facilitate making the statistics, the 288 pieces of report information may be merged into a long report information chain, and each data slice corresponds to one report information chain. Meanwhile, the system may obtain the loads of the respective servers from the webmaster server at a fixed time of a day, e.g., at 1:00 AM every day.

In step S20, respective servers are ranked according to loads of the respective servers, the servers are divided into a top-ranked server group and a bottom-ranked server group, in which the top-ranked server group includes n top-ranked servers allocated as high-load servers, the bottom-ranked server group includes n bottom-ranked servers allocated as low-load servers, and n is a positive integer.

In order to achieve load leveling, the present embodiment swaps a data slice on a high-load server and a data slice on a low-load server. The server may rank the respective servers according to loads of the respective servers counted from the highest to the lowest, in which a server ranked highest has a highest load, and a server ranked lowest has a lowest load. Then the top n servers are deemed as high-load servers and the bottom n servers are deemed as low-load servers. The load leveling operation is to swap data slices on the two groups of servers.

In step S30, data slices loaded on an i-th ranked high-load server are ranked according to load proportions of the respective data slices on the i-th ranked high-load server from the highest to the lowest, and data slices loaded on an i-th inversely ranked low-load server are ranked according to load proportions of the respective data slices on the i-th inversely ranked low-load server from the highest to the lowest, in which i is a positive integer, and i is less than or equal to n.

A high-load server and a low-load server may be paired into a group in advance. In the present embodiment, the respective high-load servers may be ranked according to the loads of the respective high-load servers from the highest to the lowest, and the respective low-load servers may also be ranked according to the loads of the respective low-load servers from the highest to the lowest. Then an i-th ranked high-load server in the queue of the high-load servers and an i-th inversely ranked low-load server in the queue of the low-load servers may be paired into a group, e.g., paring a high-load server that has the largest load and a low-load server that has the lowest load, pairing a high-load server that has the second largest load and a low-load server that has the second lowest load, and so on. Or the i-th ranked high-load server in the queue of the high-load servers and an i-th ranked low-load server in the queue of the low-load servers; or the high-load servers and the low-load servers are paired randomly. For each group of paired high-load server and low-load server, respective data slices on the servers are ranked according to load proportions of the respective data slices from the highest to the lowest.

In step S40, a data slice that has a high load proportion on the i-th ranked high-load server is allocated as an i-th source data slice, and a data slice that has a low load proportion on the i-th inversely ranked low-load server is allocated as an i-th target data slice.

In step S50, the i-th source data slice and the i-th target data slice are swapped.

To reduce the load of a high-load server, data slice(s) on the high-load server may be moved to a low-load server, and to prevent the low-load server from having a too large load caused by loading too many loads to the low-load server, the present embodiment may only move one or several data slices that has a relatively high load on the high-load server to the low-load server, and meanwhile, move a data slice(s) that has or have relatively low load(s) on the low-load server to the high-load server, and the number of slices moved respectively from the two servers are equal, and thus to realize the swap of data slices between the high-load server and the low-load server. In this way, the load of the high-load server is efficiently reduced, and meanwhile, since a part of data slices on the low-load server are swapped out, a part of load pressure of the low-load server is reduced and a part of load space for a data slice newly swapped in may be spared, thus efficiently avoiding a situation where when data slice(s) on the high-load server is or are swapped in the low-load server, it or they may cause the low-load server to have a too large load.

Step S60, it is determined whether all the high-load servers are leveled, i.e., whether the high-load servers and the low-load servers are all traversed (e.g., determining whether i is equal to n); and if so, then the process proceeds to step S61; or otherwise, i+1, and the process returns to step S30

In step S61, it is determined that the leveling is completed, i.e., it is determined that the high-load servers and the low-load servers have been traversed.

After source data slices and target data slices on a high-load server and on a low-load server paired into a group are swapped, the process proceeds to a next group of paired high-load server and low-load server to swap source data slices and target data slices, the leveling process continues until source data slices and target data slices on all groups of high-load servers and low-load servers paired are swapped.

The distributed database system of the present embodiment ranks servers according to loads of the servers, filters out high-load servers and low-load servers respectively, and swaps a data slice that has a high load proportion on a high-load server and a data slice that has a low load proportion on a low-load server, thereby on one hand, effectively reducing the load of the high-load server, and on the other hand, reducing a part of load pressure of the low-load server and sparing a part of load space for a data slice newly swapped in because a part of data slices on the low-load server are swapped out, and thus avoiding a situation where when a data slice on a high-load server is swapped in a low-load server, it may cause the low-load server has a too large load, and effectively reducing the load of the overall distributed database system.

Figure 3:
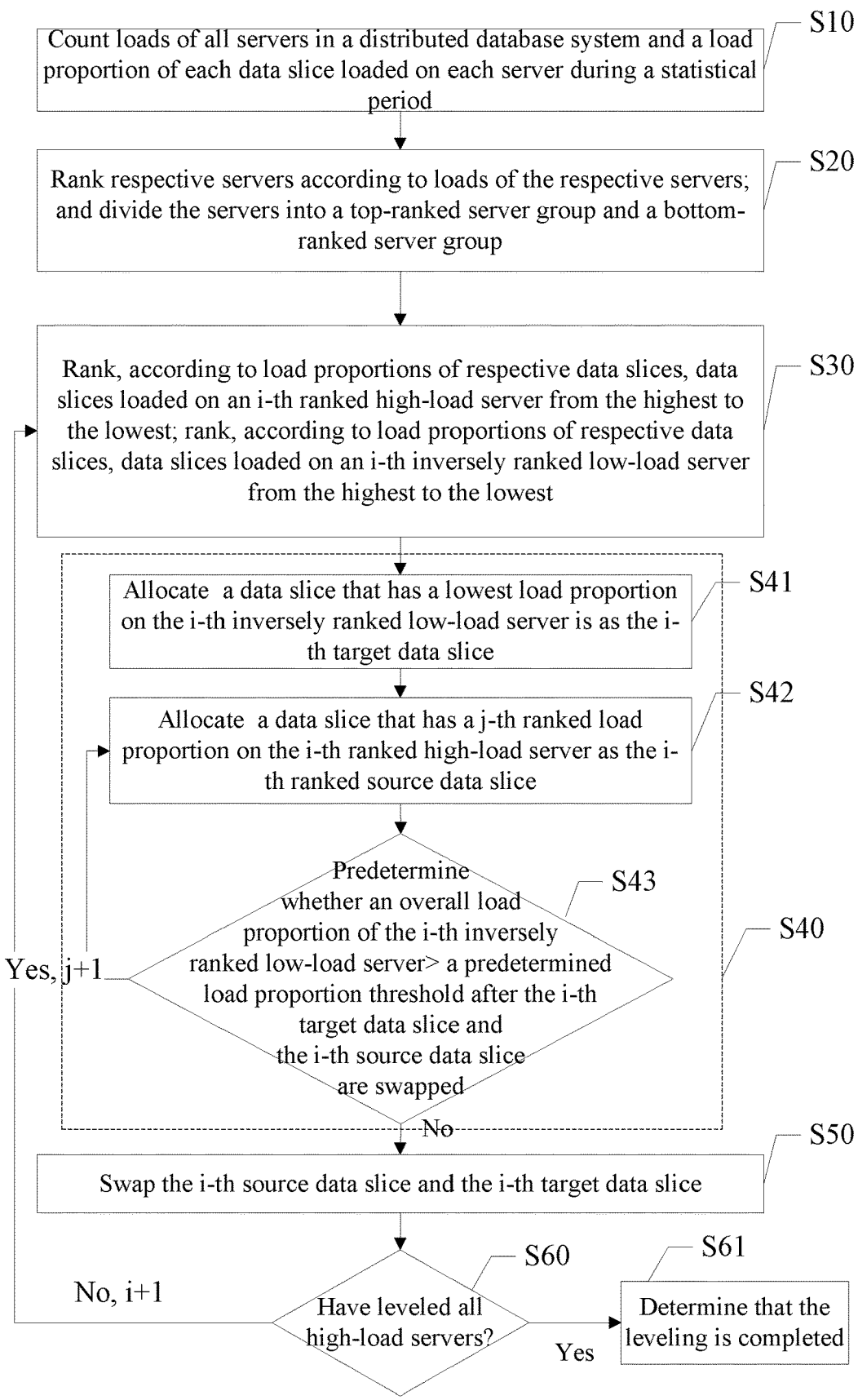
FIG. 3 is a flow chart of another embodiment of the method for leveling loads of distributed databases according to the present disclosure.

As shown in FIG. 3, FIG. 3 is a flow chart of another embodiment of the method for leveling loads of distributed databases according to the present disclosure. The present embodiment includes the steps of the embodiment shown in FIG. 2, in which step S40 includes the following:

In step S41, a data slice that has a lowest load proportion on the i-th inversely ranked low-load server is allocated as the i-th target data slice.

In the present embodiment, for the low-load servers ranked according to their loads from the highest to the lowest, a low-load server ranked in the front has a relatively high load, and a low-load server ranked in the rear has a relatively low load. and meanwhile, for the high-load servers, a high-load serer ranked in the front has a relatively high load, and a high-load server ranked in the rear has a relatively low load. To most efficiently leveling the loads of the distributed database system, a server that has the highest load may be paired with a server that has the lowest load, a server that has the second highest load may be paired with a server that has the second lowest load, and so on, i.e., an i-th ranked high-load server is paired with an i-th inversely ranked low-load server as a group.

For a group of high-load and low-load servers paired, the present embodiment only swaps one data slice on the high-load server and one data slice on the low-load server, and multiple data slices may be swapped, in which case, a method used may be deduced in a way same as that for swapping one pair of data slices. A target data slice may be determined on the low-load server, and to significantly reduce the load of the high-load server, a data slice that has the lowest load proportion on the low-load server is used as the target data slice.

In step S42, a data slice that has a j-th ranked load proportion on the i-th ranked high-load server is allocated as the i-th source data slice, The source data slice is determined on the high-load server, but the determined source data slice and the target data slice are not swapped directly, but it is predetermined whether the source data slice selected is suitable. When the source data slice is to be determined, a data slice that has the j-th ranked load proportion is used as the source data slice, where j is a positive integer, an initial value of j is 1, and j is less than or equal to the number of data slices on the high-load server. That is, initially, the source data slice may be selected starting from a data slice that has the highest load proportion, and if after predetermination, it is determined that even if the source data slice is swapped, an overall load press of the distributed database system still cannot be alleviated, then a data slice that has the second highest load proportion is used as the source data slice, and then a determination is performed accordingly.

Step S43, it is predetermined whether an overall load proportion of the i-th inversely ranked low-load server among the respective servers is more than a predetermined server load proportion threshold after the i-th target data slice and the i-th source data slice are swapped; and if so, then j+1, and the process returns to step S42; or otherwise, step S50 is executed.

When performing the predetermination, the method assumes that the target data slice and the source data slice have been swapped, uses an overall load of the low-load server minus a load of the target data slice, then adds it with a load of the source data slice, and then compares whether an overall load proportion calculated is more than a predetermined server load proportion threshold. If so, then it is indicates that the source data slice selected this time is not suitable, and that if the source data slice is swapped in the low-load server, it may cause the load of the low-load server too high, and in this case, a new source data slice needs to be re-selected, and the source data slice is updated using a data slice that has a load proportion ranked next to the source data slice, and the predetermination operation is performed again. The process continues until an overall load proportion of the low-load server among the respective servers is smaller than or equal to the predetermined server load proportion threshold, which indicates that a currently selected source data slice is suitable, and if the currently selected source data slice and the target data slice are swapped, the currently selected source data slice will not cause the load of the low-load server too high.

In the present embodiment, it is predetermined whether the swapping may cause the load of the low-load server to high, and if so, then a new resource data slice is re-selected, and the predetermination is re-performed, until a source data slice selected won't cause the load of the low-load server too high after it is swapped with the target data slice. In this way, the method can reduce the load of the high-load server, and meanwhile guarantee the normal load of the low-load server and ensures the overall distributed database system to run efficiently.

Figure 4:
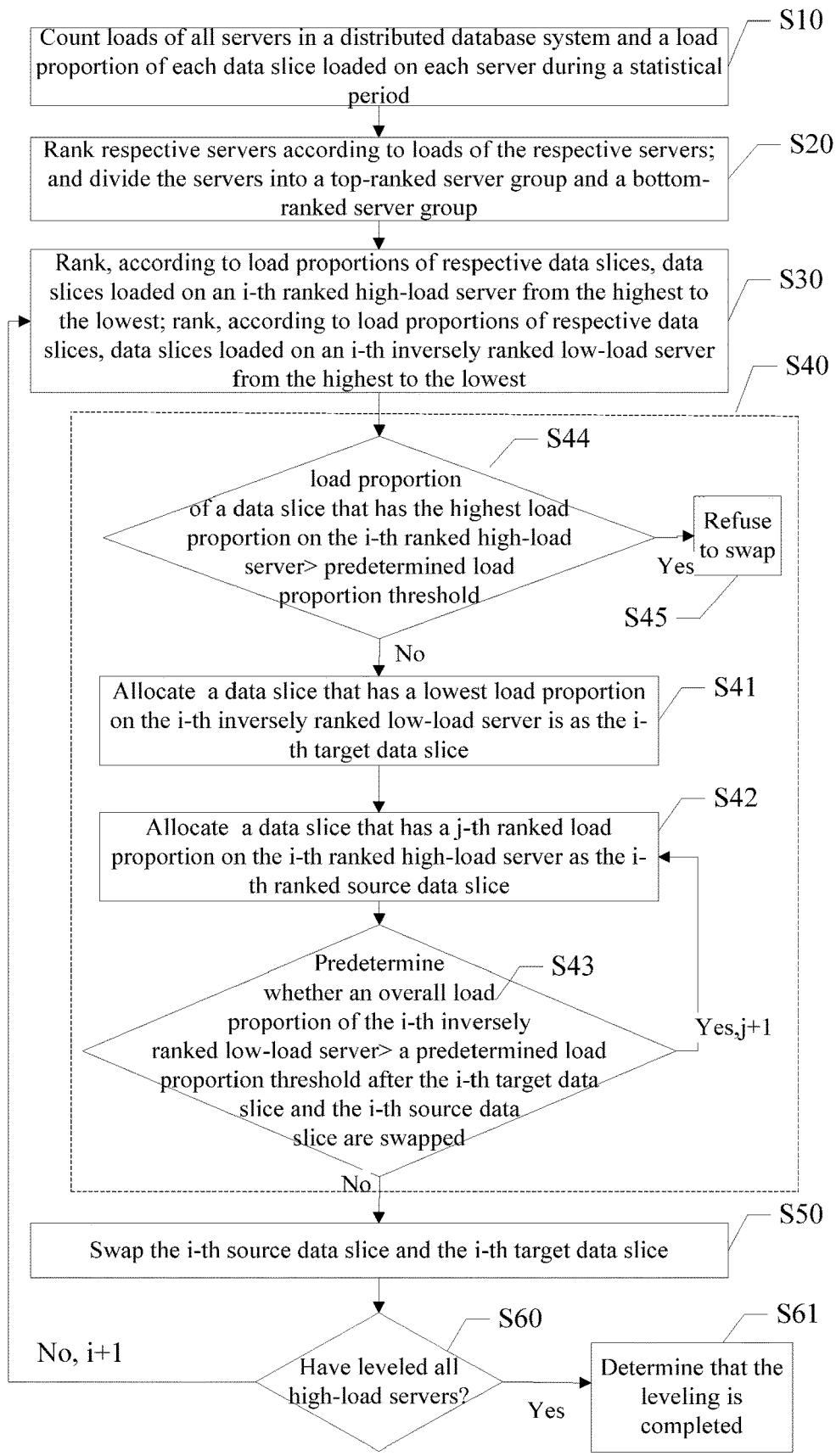
FIG. 4 is a flow chart of another embodiment of the method for leveling loads of distributed databases according to the present disclosure.

As shown in FIG. 4, FIG. 4 is a flow chart of another embodiment of the method for leveling loads of distributed databases according to the present disclosure. The embodiment includes the steps in the embodiment shown in FIG. 3, and before step S41, the method further includes:

Step S44, it is determined whether a load proportion of a data slice that has the highest load proportion on the i-th ranked high-load server is more than a predetermined data slice load proportion threshold; and if so, then step S45 is executed; or if no, then step S41 is performed.

Step S45, data slices on the i-th ranked high-load server are not to use to perform a swapping operation.

In the present embodiment, before performing the predetermination and data slice leveling, it also determines whether a load proportion of a data slice on the high-load server is too high. If after the data slice that has a too high load proportion is moved to a low-load server, it will cause the load of the low-load server too high, and when perform a next leveling cycle, the original low-load server will be allocated as a high-load server, and the data slice that has the too high load proportion is re-swapped out, which causes repeatedly transfer of the data slices. In this case, to avoid repeating the transfer operation, a high-load server that has a data slice that has a too high load proportion, but it is processed in other ways or manually. In addition, for a low-load server that is paired with the high-load server, it may be paired with another high-load server, or it may be reserved for being paired during next leveling cycle.

Figure 5:
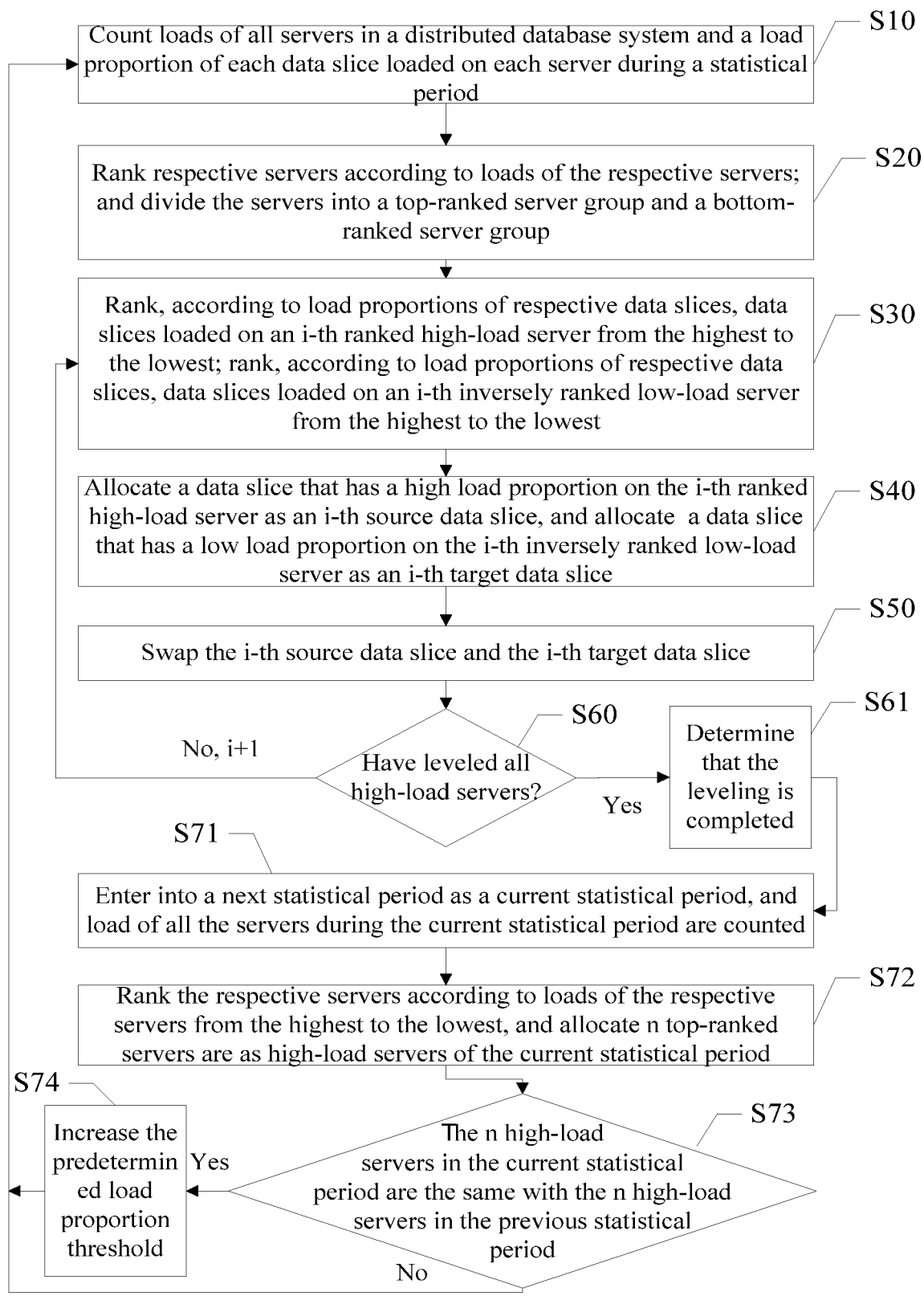
FIG. 5 is a flow chart of another embodiment of the method for leveling loads of distributed databases according to the present disclosure.

As shown in FIG. 5, FIG. 5 is a flow chart of another embodiment of the method for leveling loads of distributed databases of the present disclosure. The present embodiment includes the steps in the embodiment shown in FIG. 2, and after step S61, the method further includes the following steps:

Step S71, a next statistical period is entered into as a current statistical period, and loads of all the servers during the current statistical period are counted.

Step S72, the respective servers are ranked according to loads of the respective servers from the highest to the lowest, the servers are divided into a top-ranked server group and a bottom-ranked server group, in which the top-ranked server group includes n top-ranked servers allocated as high-load servers in the current statistical period.

Step S73, it is determined whether the n high-load servers in the current statistical period are the same with the n high-load servers in the previous statistical period; and if so, step S74 is executed; or otherwise, the process returns to step S10.

Step S74, the predetermined data slice load proportion threshold is increased, and the process returns to step S10.

The present embodiment also determines whether a leveling policy is reasonable, counting loads of the respective servers when they run in the next period, and determines whether the loads of the respective servers after the previous leveling operation have been improved. For example, at 1:00 am on the date 7, the loads of the respective servers during 1:00 am on the date 6 to 1:00 am on the date 7 are counted, and a first leveling operation is performed for the servers. The system continue runs, and at 1:00 am on the date 8, the loads of the respective servers during 1:00 am on the date 7 to 1:00 am on the date 8 are accounted, and it is determined whether a result of the leveling operation on date 7 is reasonable, and if so, then the leveling policy is used to perform a second leveling operation, or otherwise, the leveling policy is adjusted, and a new leveling policy is used to perform the next leveling operation. According to the statistic data, high-load servers are filtered out according to loads of the servers. If after leveling and running for a statistical period, high-load servers filtered out and high-load servers before the leveling are same, it indicates that the load pressures of the high-load servers in the previous statistical period are not alleviated, and the leveling policy does not work. In this case, the leveling policy needs to be adjusted, e.g., increasing the predetermined data slice load proportion threshold, and when a data slice that has a relatively large load proportion is selected on a high-load server, a relative large load proportion on the high-load server can be transferred to a low-load server, which ensures the effectiveness of the leveling policy.

Figure 6:
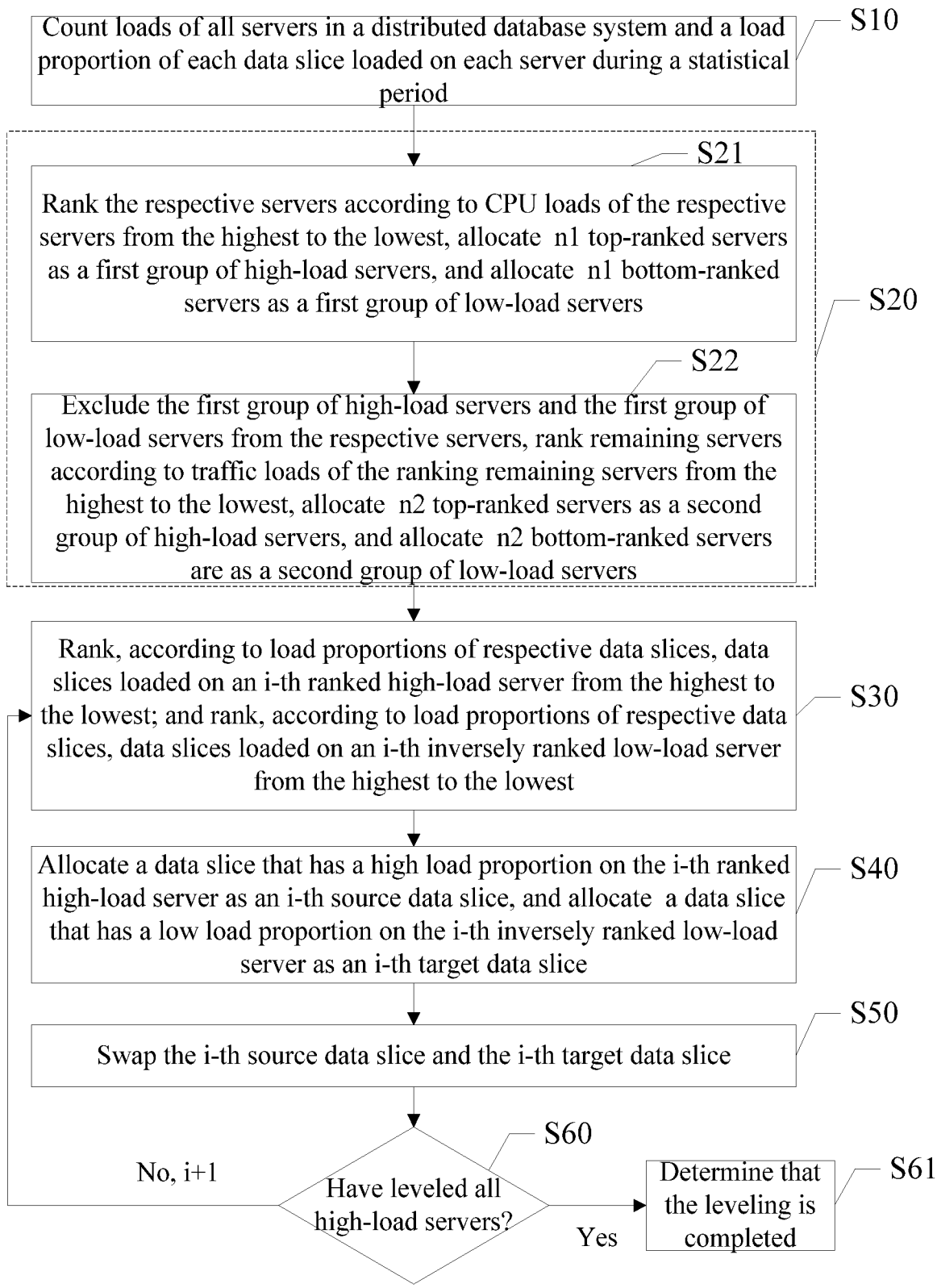
FIG. 6 is a flow chart of another embodiment of the method for leveling loads of distributed databases according to the present disclosure.

As shown in FIG. 6, FIG. 6 is a flow chart of another embodiment of the method for leveling loads of distributed databases according to the present disclosure. The present embodiment includes the steps in the embodiment shown in FIG. 2, and in the method, step S20 includes:

Step S21, the respective servers are ranked according to CPU loads of the respective servers from the highest to the lowest, n1 top-ranked servers are allocated as a first group of high-load servers, and n1 bottom-ranked servers are allocated as a first group of low-load servers, where n1 is a positive integer less than n.

Step S22, the first group of high-load servers and the first group of low-load servers are excluded from the respective servers, remaining servers are ranked according to traffic loads of the ranking remaining servers from the highest to the lowest, n2 top-ranked servers are allocated as a second group of high-load servers, and n2 bottom-ranked servers are allocated as a second group of low-load servers, where n2 is a positive integer less than n, and n1+n2=n.

In the present embodiment, when the high-load servers and low-load servers are to filtered out, the servers may be ranked in the CPU load and the traffic load aspects, and the priorities of the CPU load and traffic load may be configured in advance. In the present embodiment, for example, the priority of the CPU load is higher than that of the traffic load. Then, first, the servers in the system are ranked according to the CPU loads thereof from the highest to the lowest, and a first set of high-load servers and a first set of low-load servers are filtered out, then a filtering out operation is performed for the remaining servers to rank the remaining servers according to traffic loads thereof from the highest to the lowest, to filter out a second set of high-load servers and a second set of low-load servers. When performing the pairing operation, the first set of high-load servers are one-to-one paired with the first set of low-load servers, and the second set of high-load servers and the second set of low-load servers are one-to-one paired. When data slices are to swapped, they are swapped between the first set of high-load servers and the first set of low-load servers, and the second set of high-load servers and the second set of low-load servers. Since the present embodiment filters out as servers data slices on which need to be swapped respectively from the CPU load aspect and the traffic load aspect, the swapping of data slices are more targeted, which further make the leveling policy more effective, and is advantageous for reducing an overall load of the distributed databases.

Figure 7:
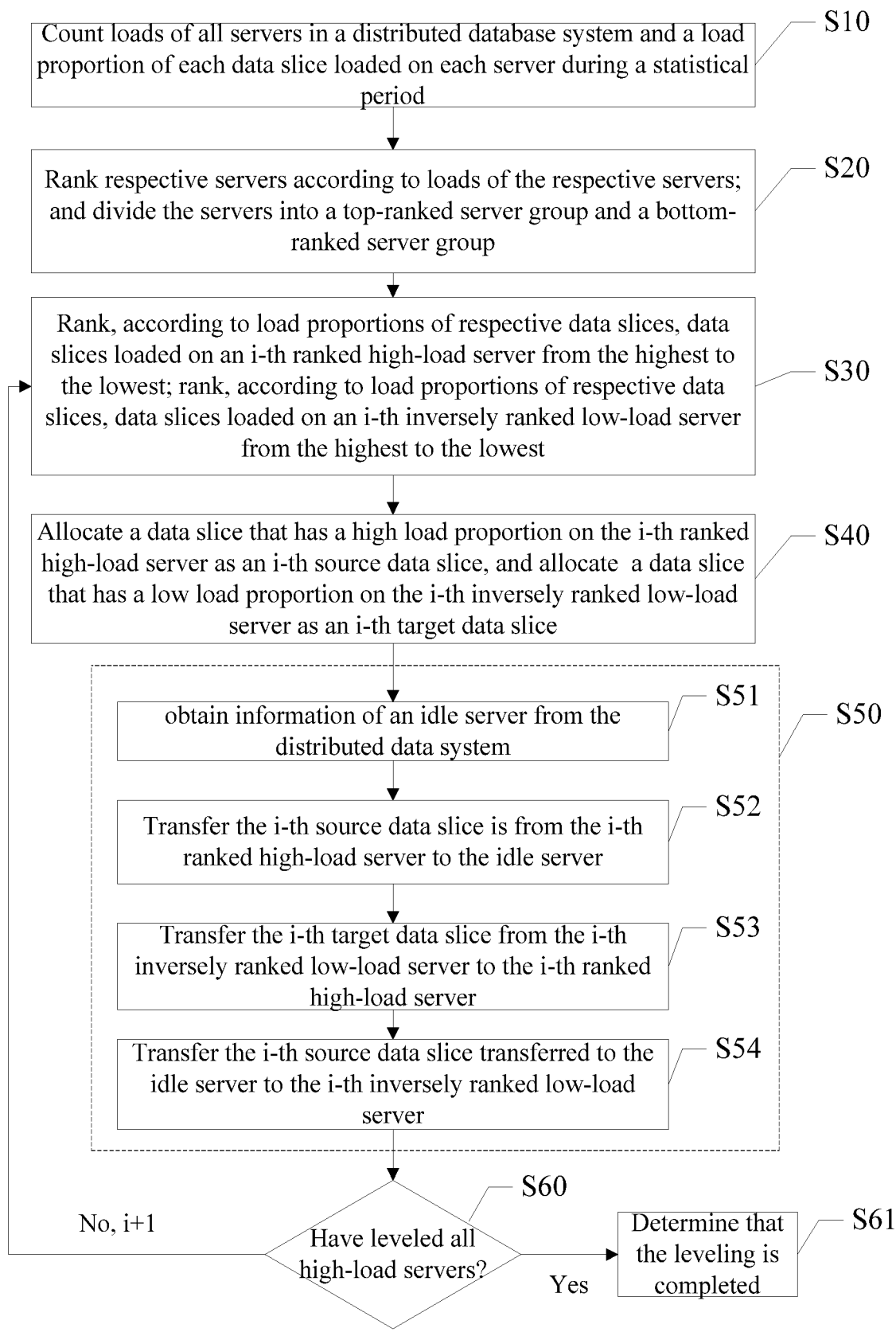
FIG. 7 is a flow chart of another embodiment of the method for leveling loads of distributed databases according to the present disclosure.

As shown in FIG. 7, FIG. 7 is a flow chart of another embodiment of the method for leveling loads of the distributed databases of the present disclosure. The present embodiment includes the steps in the embodiment shown in FIG. 2, and the step S50 includes:

Step S51, obtaining information of an idle server is obtained from the distributed data system.

Step S52, the i-th source data slice is transferred from the i-th ranked high-load server to the idle server.

Step S53, the i-th target data slice is transferred from the i-th inversely ranked low-load server to the i-th ranked high-load server.

Step S54, the i-th source data slice transferred to the idle server is transferred to the i-th inversely ranked low-load server.

In the present embodiment, to avoid the fact that when the low-load server is not free, if a source data slice is transferred to the low-load server, it may cause the load of the low-load server too high and affect the efficiency of data transfer, the distributed database system will be reserved for a part of free resources, i.e., idle server(s), the source data slice is first transferred from the high-load server to an idle server, and then the target data slice is transferred from the low-load server to the high-load server, the source data slice is transferred to the low-load server. However, if the low-load server is free, then the source data slice may be transferred from the high-load server to the low-load server directly, and then the target data slice is transferred from the low-load server to the high-load server. It may be predetermined whether the low-load server is free, and if so, then the swapping operation is performed directly, or otherwise, it is performed through the free server, which improves the efficiency of transferring data slices, and ensures the load leveling is performed efficiently.

Figure 8:
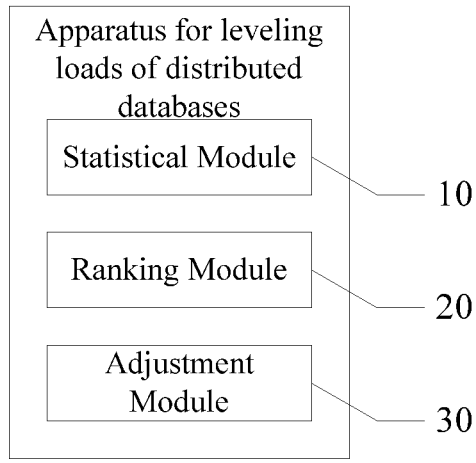
FIG. 8 is a schematic diagram of an embodiment of modules of an apparatus for leveling loads of distributed databases according to the present disclosure.

As shown in FIG. 8, FIG. 8 is a schematic diagram of an embodiment of modules of an apparatus for leveling loads of distributed databases according to the present disclosure.

The apparatus for leveling loads of distributed databases provided according to the present embodiment includes the following:

a statistical module 10 to count loads of all servers in a distributed database system and a load proportion of each data slice loaded on each server during a statistical period;

a ranking module 20 to rank respective servers according to loads of the respective servers from the highest to the lowest, and divide the servers into a top-ranked server group and a bottom-ranked server group, in which the top-ranked server group includes n top-ranked servers allocated as high-load servers, the bottom-ranked server group includes n bottom-ranked servers allocated as low-load servers, and n is a positive integer; and rank respective data slices on an i-th ranked high-load server according to load proportions of the respective data slices on the i-th ranked high-load server from the highest to the lowest, and rank respective data slices on an i-th inversely ranked low-load server according to load proportions of the respective data slices on the i-th inversely ranked low-load server from the highest to the lowest, where i is a positive integer, and i is less than or equal to n; and an adjustment module 30 to allocate a data slice that has a high load proportion on the i-th ranked high-load server as an i-th source data slice, allocate a data slice that has a low load proportion on the i-th inversely ranked low-load server as an i-th target data slice, and swap the i-th source data slice and the i-th target data slice; the process of the adjustment module 30 continues until all the high-load servers are leveled, i.e., all the high-load severs and low-load servers are traversed.

The distributed database system of the present embodiment includes a plurality of shard servers, and each server is loaded with a plurality of data slices. On each server, a monitoring and reporting program is deployed in advance to report information such as a number of data requests and an amount of traffic occupied when a data slice is accessed to a statistic database of the distributed database system at regular intervals. Meanwhile, the system may also obtain loads of respective servers, e.g., CPU loads and traffic loads, during a current statistical period from a webmaster server. According to information such as a number of data requests and an amount of traffic of access of a certain data slice and a load of a server where the data slice is located reported in the current statistical period, the system obtains a load proportion of the data slice in the load of the server, i.e., a proportion of a load caused when the server processes the access request(s) of the data slice in a total load of the server. The statistical period may be 24 hours a day, or more. Take 24 hours as an example, the monitoring and reporting program may report data every 5 minutes, and then there are 288 pieces of report information for a data slice in 24 hours. To facilitate making the statistics, the 288 pieces of report information may be merged into a long report information chain, and each data slice corresponds to one report information chain. Meanwhile, the system may obtain the loads of the respective servers from the webmaster server at a fixed time of a day, e.g., at 1:00 AM every day.

In order to achieve load leveling, the present embodiment swaps a data slice on a high-load server and a data slice on a low-load server. The server may rank the respective servers according to loads of the respective servers counted from the highest to the lowest, in which a server ranked highest has a highest load, and a server ranked lowest has a lowest load. Then the top n servers are deemed as high-load servers and the bottom n servers are deemed as low-load servers. The load leveling operation is to swap data slices on the two groups of servers.

A high-load server and a low-load server may be paired into a group in advance. In the present embodiment, the respective high-load servers may be ranked according to the loads of the respective high-load servers from the highest to the lowest, and the respective low-load servers may also be ranked according to the loads of the respective low-load servers from the highest to the lowest. Then an i-th ranked high-load server in the queue of the high-load servers and an i-th inversely ranked low-load server in the queue of the low-load servers may be paired into a group, e.g., paring a high-load server that has the largest load and a low-load server that has the lowest load, pairing a high-load server that has the second largest load and a low-load server that has the second lowest load, and so on. Or the i-th ranked high-load server in the queue of the high-load servers and an i-th ranked low-load server in the queue of the low-load servers; or the high-load servers and the low-load servers are paired randomly. For each group of paired high-load server and low-load server, respective data slices on the servers are ranked according to load proportions of the respective data slices from the highest to the lowest.

To reduce the load of a high-load server, data slice(s) on the high-load server may be moved to a low-load server, and to prevent the low-load server from having a too large load caused by loading too many loads to the low-load server, the present embodiment may only move one or several data slices that has a relatively high load on the high-load server to the low-load server, and meanwhile, move a data slice(s) that has or have relatively low load(s) on the low-load server to the high-load server, and the number of slices moved respectively from the two servers are equal, and thus to realize the swap of data slices between the high-load server and the low-load server. In this way, the load of the high-load server is efficiently reduced, and meanwhile, since a part of data slices on the low-load server are swapped out, a part of load pressure of the low-load server is reduced and a part of load space for a data slice newly swapped in may be spared, thus efficiently avoiding a situation where when data slice(s) on the high-load server is or are swapped in the low-load server, it or they may cause the low-load server to have a too large load.

After source data slices and target data slices on a high-load server and on a low-load server paired into a group are swapped, the process proceeds to a next group of paired high-load server and low-load server to swap source data slices and target data slices, the leveling process continues until source data slices and target data slices on all groups of high-load servers and low-load servers paired are swapped.

The distributed database system of the present embodiment ranks servers according to loads of the servers, filters out high-load servers and low-load servers respectively, and swaps a data slice that has a high load proportion on a high-load server and a data slice that has a low load proportion on a low-load server, thereby on one hand, effectively reducing the load of the high-load server, and on the other hand, reducing a part of load pressure of the low-load server and sparing a part of load space for a data slice newly swapped in because a part of data slices on the low-load server are swapped out, and thus avoiding a situation where when a data slice on a high-load server is swapped in a low-load server, it may cause the low-load server has a too large load, and effectively reducing the load of the overall distributed database system.

Figure 9:
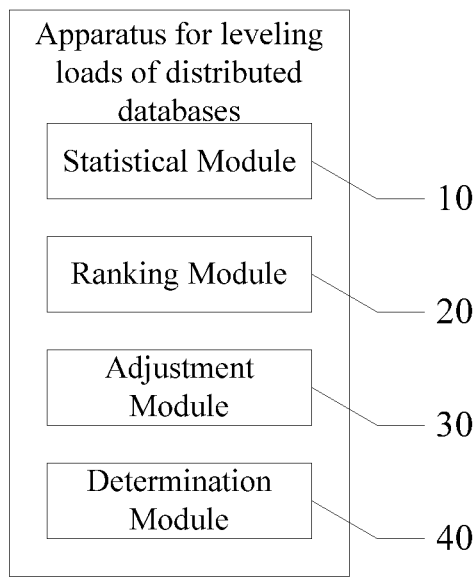
FIG. 9 is a schematic diagram of another embodiment of modules of an apparatus for leveling loads of distributed databases according to the present disclosure.

As shown in FIG. 9, FIG. 9 is a schematic diagram of another embodiment of modules of an apparatus for leveling loads of distributed databases according to the present disclosure. The present embodiment includes the modules of the embodiment shown in FIG. 8, and further includes a determination module 40.

The adjustment module 30 is further configured to allocate a data slice that has a lowest load proportion on the i-th inversely ranked low-load server as the i-th target data slice; and allocate a data slice that has a j-th ranked load proportion on the i-th ranked high-load server as the i-th source data slice, where j is a positive integer, an initial value of j is 1, and j is less than or equal to the number of data slices on the i-th ranked high-load server.

The determination module 40 is configured to predetermine whether an overall load proportion of the i-th inversely ranked low-load server among the respective servers is more than a predetermined server load proportion threshold after the i-th target data slice and the i-th source data slice are swapped.

The adjustment module 30 is further configured to, when the determination module 40 predetermines that the overall load proportion of the i-th inversely ranked low-load server among the respective servers is more than the predetermined server load proportion threshold, update the i-th source data slice using a data slice next to the data slice that has the j-th ranked load proportion on the i-th ranked high-load server.

The determination module 40 is further configured to predetermine whether the overall load proportion of the i-th inversely ranked low-load server among the respective servers is more than the predetermined server load proportion threshold after the i-th target data slice and the updated i-th source data slice are swapped, until the overall load proportion of the i-th inversely ranked low-load server is less than or equal to the predetermined server load proportion threshold.

In the present embodiment, for the low-load servers ranked according to their loads from the highest to the lowest, a low-load server ranked in the front has a relatively high load, and a low-load server ranked in the rear has a relatively low load. And meanwhile, for the high-load servers, a high-load serer ranked in the front has a relatively high load, and a high-load server ranked in the rear has a relatively low load. To most efficiently leveling the loads of the distributed database system, a server that has the highest load may be paired with a server that has the lowest load, a server that has the second highest load may be paired with a server that has the second lowest load, and so on, i.e., an i-th ranked high-load server is paired with an i-th inversely ranked low-load server as a group.

For a group of high-load and low-load servers paired, the present embodiment only swaps one data slice on the high-load server and one data slice on the low-load server, and multiple data slices may be swapped, in which case, a method used may be deduced in a way same as that for swapping one pair of data slices. A target data slice may be determined on the low-load server, and to significantly reduce the load of the high-load server, a data slice that has the lowest load proportion on the low-load server is used as the target data slice.

The source data slice is determined on the high-load server, but the determined source data slice and the target data slice are not swapped directly, but it is predetermined whether the source data slice selected is suitable. When the source data slice is to be determined, a data slice that has the j-th ranked load proportion is used as the source data slice, where j is a positive integer, an initial value of j is 1, and j is less than or equal to the number of data slices on the high-load server. That is, initially, the source data slice may be selected starting from a data slice that has the highest load proportion, and if after predetermination, it is determined that even if the source data slice is swapped, an overall load press of the distributed database system still cannot be alleviated, then a data slice that has the second highest load proportion is used as the source data slice, and then a determination is performed accordingly.

When performing the predetermination, the method assumes that the target data slice and the source data slice have been swapped, uses an overall load of the low-load server minus a load of the target data slice, then adds it with a load of the source data slice, and then compares whether an overall load proportion calculated is more than a predetermined server load proportion threshold. If so, then it is indicates that the source data slice selected this time is not suitable, and that if the source data slice is swapped in the low-load server, it may cause the load of the low-load server too high, and in this case, a new source data slice needs to be re-selected, and the source data slice is updated using a data slice that has a load proportion ranked next to the source data slice, and the predetermination operation is performed again. The process continues until an overall load proportion of the low-load server among the respective servers is smaller than or equal to the predetermined server load proportion threshold, which indicates that a currently selected source data slice is suitable, and if the currently selected source data slice and the target data slice are swapped, the currently selected source data slice will not cause the load of the low-load server too high.

In the present embodiment, it is predetermined whether the swapping may cause the load of the low-load server to high, and if so, then a new resource data slice is re-selected, and the predetermination is re-performed, until a source data slice selected won't cause the load of the low-load server too high after it is swapped with the target data slice. In this way, the method can reduce the load of the high-load server, and meanwhile guarantee the normal load of the low-load server and ensures the overall distributed database system to run efficiently.

Further, the determination module 40 is further configured to determine whether a load proportion of a data slice that has the highest load proportion on the i-th ranked high-load server is more than a predetermined data slice load proportion threshold; and if so, then the adjustment module 30 is further configured to refuse to perform a swapping operation using data slices on the i-th ranked high-load server; or if no, then the adjustment module 30 is further configured to perform the step of allocating a data slice that has a lowest load proportion on the i-th inversely ranked low-load server as the i-th target data slice.

In the present embodiment, before performing the predetermination and data slice leveling, it also determines whether a load proportion of a data slice on the high-load server is too high. If after the data slice that has a too high load proportion is moved to a low-load server, it will cause the load of the low-load server too high, and when perform a next leveling cycle, the original low-load server will be allocated as a high-load server, and the data slice that has the too high load proportion is re-swapped out, which causes repeatedly transfer of the data slices. In this case, to avoid repeating the transfer operation, a high-load server that has a data slice that has a too high load proportion, but it is processed in other ways or manually. In addition, for a low-load server that is paired with the high-load server, it may be paired with another high-load server, or it may be reserved for being paired during next leveling cycle.

Further, the statistical module 10 is further configured to enter into a next statistical period as a current statistical period, and count loads of all the servers during the current statistical period.

The ranking module 20 is further configured to rank the respective servers according to loads of the respective servers from the highest to the lowest, and allocate n top-ranked servers as high-load servers in the current statistical period.

The determination module 40 is configured to determine whether the n high-load servers in the current statistical period are the same with the n high-load servers in the previous statistical period.

If so, then the adjustment module 30 is further configured to increase the predetermined data slice load proportion threshold, and re-level all the high-load servers in the current statistical period, i.e., traversing high-load servers and low-load servers again, and perform corresponding operations.

The present embodiment also determines whether a leveling policy is reasonable, counting loads of the respective servers when they run in the next period, and determines whether the loads of the respective servers after the previous leveling operation have been improved. For example, at 1:00 am on the date 7, the loads of the respective servers during 1:00 am on the date 6 to 1:00 am on the date 7 are counted, and a first leveling operation is performed for the servers. The system continue runs, and at 1:00 am on the date 8, the loads of the respective servers during 1:00 am on the date 7 to 1:00 am on the date 8 are accounted, and it is determined whether a result of the leveling operation on date 7 is reasonable, and if so, then the leveling policy is used to perform a second leveling operation, or otherwise, the leveling policy is adjusted, and a new leveling policy is used to perform the next leveling operation. According to the statistic data, high-load servers are filtered out according to loads of the servers. If after leveling and running for a statistical period, high-load servers filtered out and high-load servers before the leveling are same, it indicates that the load pressures of the high-load servers in the previous statistical period are not alleviated, and the leveling policy does not work. In this case, the leveling policy needs to be adjusted, e.g., increasing the predetermined load proportion threshold, and when a data slice that has a relatively large load proportion is selected on a high-load server, a relative large load proportion on the high-load server can be transferred to a low-load server, which ensures the effectiveness of the leveling policy.

Further, the ranking module 20 is configured to:

rank the respective servers according to CPU loads of the respective servers from the highest to the lowest, allocate n1 top-ranked servers as a first group of high-load servers, and allocate n1 bottom-ranked servers as a first group of low-load servers, where n1 is a positive integer less than n;

exclude the first group of high-load servers and the first group of low-load servers from the respective servers, rank remaining servers according to traffic loads of the ranking remaining servers from the highest to the lowest, allocate n2 top-ranked servers as a second group of high-load servers, and allocate n2 bottom-ranked servers as a second group of low-load servers, where n2 is a positive integer less than n, and n1+n2=n.

In the present embodiment, when the high-load servers and low-load servers are to filtered out, the servers may be ranked in the CPU load and the traffic load aspects, and the priorities of the CPU load and traffic load may be configured in advance. In the present embodiment, for example, the priority of the CPU load is higher than that of the traffic load. Then, first, the servers in the system are ranked according to the CPU loads thereof from the highest to the lowest, and a first set of high-load servers and a first set of low-load servers are filtered out, then a filtering out operation is performed for the remaining servers to rank the remaining servers according to traffic loads thereof from the highest to the lowest, to filter out a second set of high-load servers and a second set of low-load servers. When performing the pairing operation, the first set of high-load servers are one-to-one paired with the first set of low-load servers, and the second set of high-load servers and the second set of low-load servers are one-to-one paired. When data slices are to swapped, they are swapped between the first set of high-load servers and the first set of low-load servers, and the second set of high-load servers and the second set of low-load servers. since the present embodiment filters out servers data slices on which need to be swapped respectively from the CPU load aspect and the traffic load aspect, the swapping of data slices are more targeted, which further make the leveling policy more effective, and is advantageous for reducing an overall load of the distributed databases.

Further, the adjustment module 30 is configured to:
obtain information of an idle server from the distributed data system;
transfer the i-th source data slice from the i-th ranked high-load server to the idle server;
transfer the i-th target data slice from the i-th inversely ranked low-load server to the i-th ranked high-load server; and
transfer the i-th source data slice transferred to the idle server to the i-th inversely ranked low-load server.

In the present embodiment, to avoid the fact that when the low-load server is not free, if a source data slice is transferred to the low-load server, it may cause the load of the low-load server too high and affect the efficiency of data transfer, the distributed database system will be reserved for a part of free resources, i.e., idle server(s), the source data slice is first transferred from the high-load server to an idle server, and then the target data slice is transferred from the low-load server to the high-load server, the source data slice is transferred to the low-load server. However, if the low-load server is free, then the source data slice may be transferred from the high-load server to the low-load server directly, and then the target data slice is transferred from the low-load server to the high-load server. It may be predetermined whether the low-load server is free, and if so, then the swapping operation is performed directly, or otherwise, it is performed through the free server, which improves the efficiency of transferring data slices, and ensures the load leveling is performed efficiently.

It should be noted that, in this specification, terms like "first" and "second" are only used to differentiate one entity or operation from another, but are not necessarily used to indicate any practical relationship or order between these entities or operations. Moreover, a term such as "include", "contain" or any variation of the term means "including but not limited to". Therefore, a process, method, object, or device that includes a series of elements not only includes these elements, but also includes other elements that are not specified expressly, or may further include inherent elements of the process, method, object or device. In the case that there are no more limitations, in the context of a element that is specified by "include one . . . ", the process, method, object or device that includes a specified element may include other identical elements.

The sequence numbers of the embodiments of the present disclosure are merely for description purpose, and should not be construed as limitations to the superiority or inferiority of the embodiments.

Through the description of the embodiments, a person skilled in the art would be aware that the methods in the foregoing embodiments may be implemented by way of software with a necessary general hardware platform, and also may be implemented by way of hardware. The part of the technical solution of the present disclosure that makes contributes to the traditional art may be embodied as a software product, and the computer software product is stored on a storage medium (e.g., a ROM/RAM, a magnetic disk, or an optical disk), including some instructions to enable a terminal device (e.g., a mobile phone, a computer, a server, or a network device) to perform the methods in various embodiments of the present disclosure.

The forgoing descriptions are merely exemplary embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A method for leveling loads of distributed databases, implemented on an apparatus for leveling loads of distributed databases comprising a memory storing instructions and a processor in communication with the memory, the method comprising:
    counting loads of all servers in a distributed database system and a load proportion of each data slice loaded on each server during a statistical period;
    ranking respective servers according to loads of the respective servers; and dividing the servers into a top-ranked server group and a bottom-ranked server group, wherein the top-ranked server group comprises n top-ranked servers allocated as high-load servers, the bottom-ranked server group comprises n bottom-ranked servers allocated as low-load servers, and n is a positive integer;
    traversing the high-load servers and the low-load servers to perform the following operations, comprising:
    ranking, according to load proportions of respective data slices, data slices loaded on an i-th ranked high-load server from the highest to the lowest;
    ranking, according to load proportions of respective data slices, data slices loaded on an i-th inversely ranked low-load server from the highest to the lowest, wherein i is a positive integer, and i is less than or equal to n;
    allocating a data slice on the i-th ranked high-load server as an i-th source data slice;
    allocating a data slice on the i-th inversely ranked low-load server as an i-th target data slice; and
    in response to predetermining that an overall load proportion of the i-th inversely ranked low-load server among the respective servers is less than or equal to a predetermined load proportion threshold after the i-th target data slice and the i-th source data slice are swapped,
    swapping the i-th source data slice and the i-th target data slice.

2. The method of claim 1, wherein the allocating a data slice on the i-th ranked high-load server as an i-th source data slice, and allocating a data slice on the i-th inversely ranked low-load server as an i-th target data slice comprises:

allocating a data slice that has a lowest load proportion on the i-th inversely ranked low-load server as the i-th target data slice;

allocating a data slice that has a j-th ranked load proportion on the i-th ranked high-load server as the i-th source data slice, where j is a positive integer, an initial value of j is 1, and j is less than or equal to the number of data slices on the i-th ranked high-load server;

predetermining whether an overall load proportion of the i-th inversely ranked low-load server among the respective servers is more than a predetermined first load proportion threshold after the i-th target data slice and the i-th source data slice are swapped; and if so, then updating the i-th source data slice using a data slice next to the data slice that has the j-th ranked load proportion on the i-th ranked high-load server, and predetermining whether the overall load proportion of the i-th inversely ranked low-load server among the respective servers is more than the predetermined first load proportion threshold after the i-th target data slice and the updated i-th source data slice are swapped, until the overall load proportion of the i-th inversely ranked low-load server among the respective servers is less than or equal to the predetermined first load proportion threshold.

3. The method of claim 2, wherein before the allocating a data slice that has a lowest load proportion on the i-th inversely ranked low-load server as the i-th target data slice, the method further comprises:

determining whether a load proportion of a data slice that has the highest load proportion on the i-th ranked high-load server is more than a predetermined second load proportion threshold; and if so, then refusing to perform a swapping operation using data slices on the i-th ranked high-load server; or if no, then performing the step of allocating a data slice that has a lowest load proportion on the i-th inversely ranked low-load server as the i-th target data slice.

4. The method of claim 2, wherein after the traversing the high-load servers and the low-load servers to perform the operations, the method further comprises:

entering into a next statistical period as a current statistical period, and counting loads of all the servers during the current statistical period;

ranking the respective servers according to loads of the respective servers; dividing the servers into a top-ranked server group and a bottom-ranked server group, wherein the top-ranked server group comprises n top-ranked servers allocated as high-load servers in the current statistical period;

determining whether the n high-load servers in the current statistical period are the same with the n high-load servers in the previous statistical period;

if so, then increasing the predetermined second load proportion threshold, and re-leveling all the high-load servers in the current statistical period, i.e., traversing high-load servers and low-load servers again, and performing corresponding operations.

5. The method of claim 1, wherein the dividing the servers into a top-ranked server group and a bottom-ranked server group, wherein the top-ranked server group comprises n top-ranked servers allocated as high-load servers, the bottom-ranked server group comprises n bottom-ranked servers allocated as low-load servers comprises:

ranking the respective servers according to CPU loads of the respective servers from the highest to the lowest, allocating n1 top-ranked servers as a first group of high-load servers, and allocating n1 bottom-ranked servers as a first group of low-load servers, wherein n1 is a positive integer less than n;

excluding the first group of high-load servers and the first group of low-load servers from the respective servers, ranking remaining servers according to traffic loads of the ranking remaining servers from the highest to the lowest, allocating n2 top-ranked servers as a second group of high-load servers, and allocating n2 bottom-ranked servers as a second group of low-load servers, wherein n2 is a positive integer less than n, and n1+n2=n.

6. The method of claim 1, wherein the swapping the i-th source data slice and the i-th target data slice comprises:

obtaining information of an idle server from the distributed data system;

transferring the i-th source data slice from the i-th ranked high-load server to the idle server;

transferring the i-th target data slice from the i-th inversely ranked low-load server to the i-th ranked high-load server; and transferring the i-th source data slice transferred to the idle server to the i-th inversely ranked low-load server.

7. An apparatus for leveling loads of distributed databases, comprising a processor and a memory, wherein the memory stores instructions executable by the processor and the instructions are executed to perform:

counting loads of all servers in a distributed database system and a load proportion of each data slice loaded on each server during a statistical period;

ranking respective servers according to loads of the respective servers; dividing the servers into a top-ranked server group and a bottom-ranked server group, wherein the top-ranked server group comprises n top-ranked servers allocated as high-load servers, the bottom-ranked server group comprises n bottom-ranked servers allocated as low-load servers, and n is a positive integer;

traversing the high-load servers and the low-load servers to perform the following operations, including:

ranking, according to load proportions of respective data slices, data slices loaded on an i-th ranked high-load server from the highest to the lowest;

ranking, according to load proportions of respective data slices, data slices on an i-th inversely ranked low-load server from the highest to the lowest, wherein i is a positive integer, and i is less than or equal to n;

allocating a data slice on the i-th ranked high-load server as an i-th source data slice;

allocating a data slice on the i-th inversely ranked low-load server as an i-th target data slice; and in response to predetermining that an overall load proportion of the i-th inversely ranked low-load server among the respective servers is less than or equal to a predetermined load proportion threshold after the i-th target data slice and the i-th source data slice are swapped, swapping the i-th source data slice and the i-th target data slice.

8. The apparatus of claim 7, wherein the allocating a data slice on the i-th ranked high-load server as an i-th source data slice, and allocating a data slice on the i-th inversely ranked low-load server as an i-th target data slice comprises:

allocating a data slice that has a lowest load proportion on the i-th inversely ranked low-load server as the i-th target data slice;

allocating a data slice that has a j-th ranked load proportion on the i-th ranked high-load server as the i-th source data slice, where j is a positive integer, an initial value of j is 1, and j is less than or equal to the number of data slices on the i-th ranked high-load server;

predetermining whether an overall load proportion of the i-th inversely ranked low-load server among the respective servers is more than a predetermined first load proportion threshold after the i-th target data slice and the i-th source data slice are swapped; and if so, then updating the i-th source data slice using a data slice next to the data slice that has the j-th ranked load proportion on the i-th ranked high-load server, and predetermining whether the overall load proportion of the i-th inversely ranked low-load server among the respective servers is more than the predetermined first load proportion threshold after the i-th target data slice and the updated i-th source data slice are swapped, until the overall load proportion of the i-th inversely ranked low-load server among the respective servers is less than or equal to the predetermined first load proportion threshold.

9. The apparatus of claim 8, wherein before the allocating a data slice that has a lowest load proportion on the i-th inversely ranked low-load server as the i-th target data slice, the method further comprises:

determining whether a load proportion of a data slice that has the highest load proportion on the i-th ranked high-load server is more than a predetermined second load proportion threshold; and if so, then refusing to perform a swapping operation using data slices on the i-th ranked high-load server; or if no, then performing the step of allocating a data slice that has a lowest load proportion on the i-th inversely ranked low-load server as the i-th target data slice.

10. The apparatus of claim 8, wherein after the traversing the high-load servers and the low-load servers to perform the operations, the method further comprises:

entering into a next statistical period as a current statistical period, and counting loads of all the servers during the current statistical period;

ranking the respective servers according to loads of the respective servers; dividing the servers into a top-ranked server group and a bottom-ranked server group, wherein the top-ranked server group comprises n top-ranked servers allocated as high-load servers in the current statistical period;

determining whether the n high-load servers in the current statistical period are the same with the n high-load servers in the previous statistical period;

if so, then increasing the predetermined second load proportion threshold, and re-leveling all the high-load servers in the current statistical period, i.e., traversing high-load servers and low-load servers again, and performing corresponding operations.

11. The apparatus of claim 7, wherein the dividing the servers into a top-ranked server group and a bottom-ranked server group, wherein the top-ranked server group comprises n top-ranked servers allocated as high-load servers, the bottom-ranked server group comprises n bottom-ranked servers allocated as low-load servers comprises:

ranking the respective servers according to CPU loads of the respective servers from the highest to the lowest, allocating n1 top-ranked servers as a first group of high-load servers, and allocating n1 bottom-ranked servers as a first group of low-load servers, wherein n1 is a positive integer less than n;

excluding the first group of high-load servers and the first group of low-load servers from the respective servers, allocating remaining servers according to traffic loads of the ranking remaining servers from the highest to the lowest, allocating n2 top-ranked servers as a second group of high-load servers, and allocating n2 bottom-ranked servers as a second group of low-load servers, wherein n2 is a positive integer less than n, and n1+n2=n.

12. The apparatus of claim 7, wherein the swapping the i-th source data slice and the i-th target data slice comprises:

obtaining information of an idle server from the distributed data system;

transferring the i-th source data slice from the i-th ranked high-load server to the idle server;

transferring the i-th target data slice from the i-th inversely ranked low-load server to the i-th ranked high-load server; and transferring the i-th source data slice transferred to the idle server to the i-th inversely ranked low-load server.

13. A non-transitory storage medium, storing computer instructions, wherein the computer instructions are executable by the processor to perform:

counting loads of all servers in a distributed database system and a load proportion of each data slice on each server during a statistical period;

ranking respective servers according to loads of the respective servers dividing the servers into a top-ranked server group and a bottom-ranked server group, wherein the top-ranked server group comprises n top-ranked servers allocated as high-load servers, the bottom-ranked server group comprises n bottom-ranked servers as low-load servers, and n is a positive integer;

traversing the high-load servers and the low-load servers to perform the following operations, including:

ranking, according to load proportions of respective data slices, data slices loaded on an i-th ranked high-load server from the highest to the lowest;

ranking, according to load proportions of respective data slices, data slices loaded on an i-th inversely ranked low-load server from the highest to the lowest, wherein i is a positive integer, and i is less than or equal to n;

allocating a data slice on the i-th ranked high-load server as an i-th source data slice;

allocating a data slice on the i-th inversely ranked low-load server as an i-th target data slice; and in response to predetermining that an overall load proportion of the i-th inversely ranked low-load server among the respective servers is less than or equal to a predetermined load proportion threshold after the i-th target data slice and the i-th source data slice are swapped, swapping the i-th source data slice and the i-th target data slice.

14. The non-transitory storage medium of claim 13, wherein the allocating a data slice on the i-th ranked high-load server as an i-th source data slice, and allocating a data slice on the i-th inversely ranked low-load server as an i-th target data slice comprises:

allocating a data slice that has a lowest load proportion on the i-th inversely ranked low-load server as the i-th target data slice;

allocating a data slice that has a j-th ranked load proportion on the i-th ranked high-load server as the i-th source data slice, where j is a positive integer, an initial value of j is 1, and j is less than or equal to the number of data slices on the i-th ranked high-load server;

predetermining whether an overall load proportion of the i-th inversely ranked low-load server among the respective servers is more than a predetermined first load proportion threshold after the i-th target data slice and the i-th source data slice are swapped; and if so, then updating the i-th source data slice using a data slice next to the data slice that has the j-th ranked load proportion on the i-th ranked high-load server, and predetermining whether the overall load proportion of the i-th inversely ranked low-load server among the respective servers is more than the predetermined first load proportion threshold after the i-th target data slice and the updated i-th source data are swapped, until the overall load proportion of the i-th inversely ranked low-load server is less than or equal to the predetermined first load proportion threshold.

15. The non-transitory storage medium of claim 14, wherein before the allocating a data slice that has a lowest load proportion on the i-th inversely ranked low-load server as the i-th target data slice, the method further comprises:

determining whether a load proportion of a data slice that has the highest load proportion on the i-th ranked high-load server is more than a predetermined second load proportion threshold; and if so, then refusing to perform a swapping operation using data slices on the i-th ranked high-load server; or if no, then performing the step of allocating a data slice that has a lowest load proportion on the i-th inversely ranked low-load server as the i-th target data slice.

16. The non-transitory storage medium of claim 14, wherein after the traversing the high-load servers and the low-load servers to perform the operations, the method further comprises:

entering into a next statistical period as a current statistical period, and counting loads of all the servers during the current statistical period;

ranking the respective servers according to loads of the respective servers; dividing the servers into a top-ranked server group and a bottom-ranked server group, wherein the top-ranked server group comprises n top-ranked servers allocated as high-load servers in the current statistical period;

determining whether the n high-load servers in the current statistical period are the same with the n high-load servers in the previous statistical period;

if so, then increasing the predetermined second load proportion threshold, and re-leveling all the high-load servers in the current statistical period, i.e., traversing high-load servers and low-load servers again, and performing corresponding operations.

17. The non-transitory storage medium of claim 13, wherein the dividing the servers into a top-ranked server group and a bottom-ranked server group, wherein the top-ranked server group comprises n top-ranked servers allocated as high-load servers, the bottom-ranked server group comprises n bottom-ranked servers allocated as low-load servers comprises:

ranking the respective servers according to CPU loads of the respective servers from the highest to the lowest, allocating n1 top-ranked servers as a first group of high-load servers, and allocating n1 bottom-ranked servers as a first group of low-load servers, wherein n1 is a positive integer less than n;

excluding the first group of high-load servers and the first group of low-load servers from the respective servers, ranking remaining servers according to traffic loads of the ranking remaining servers from the highest to the lowest, allocating n2 top-ranked servers as a second group of high-load servers, and allocating n2 bottom-ranked servers as a second group of low-load servers, wherein n2 is a positive integer less than n, and n1+n2=n.

18. The non-transitory storage medium of claim 13, wherein the swapping the i-th source data slice and the i-th target data slice comprises:

obtaining information of an idle server from the distributed data system;

transferring the i-th source data slice from the i-th ranked high-load server to the idle server;

transferring the i-th target data slice from the i-th inversely ranked low-load server to the i-th ranked high-load server; and transferring the i-th source data slice transferred to the idle server to the i-th inversely ranked low-load server.

* * * * *